No. 705,038. Patented July 22, 1902.
J. CHRISTY, Jr.
VEHICLE TIRE.
(Application filed Mar. 20, 1902.)

(No Model.)

Witnesses
C. H. Walker
Geo. E. Few.

Inventor
James Christy Jr.
By
Milo B. Stevens & Co
Attorneys

UNITED STATES PATENT OFFICE.

JAMES CHRISTY, JR., OF WASHINGTON, DISTRICT OF COLUMBIA.

VEHICLE-TIRE.

SPECIFICATION forming part of Letters Patent No. 705,038, dated July 22, 1902.

Application filed March 20, 1902. Serial No. 99,098. (No model.)

*To all whom it may concern:*

Be it known that I, JAMES CHRISTY, Jr., a citizen of the United States, residing at Washington, in the District of Columbia, have invented certain new and useful Improvements in Vehicle-Tires; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle-tires, and particularly to solid-rubber or cushion tires.

The tire belongs to that class having circumferential tie or retaining wires extending around the wheel on each side of the tire and also having cross pins or bars which are engaged under the tie-wires. In the manufacture of such tires it has been found to be practically or commercially impossible to use corrugated, crimped, or bowed cross-bars because of the difficulty of properly positioning such bars in the molding and vulcanizing process, the insertion of such bars after molding being manifestly impossible. Also the same difficulty is met in molding straight cross-bars in the tire. In either case the movement of the rubber in the mold often skews or displaces some of the cross-bars, which renders the tire unserviceable and imperfect, inasmuch as slight lateral displacement and projection make it impossible to properly seat the tire in the rim. Furthermore, such cross-bars have not heretofore been provided with means to lock or hold them in engagement with the tie-wires, with the defect that such bars are apt to buckle under strain and slip out from under the tie-wires.

The object of this invention is to remedy these defects and to provide a tire which will be easy and practical to make and which will have efficient means to hold it in the rim.

Figure 1:
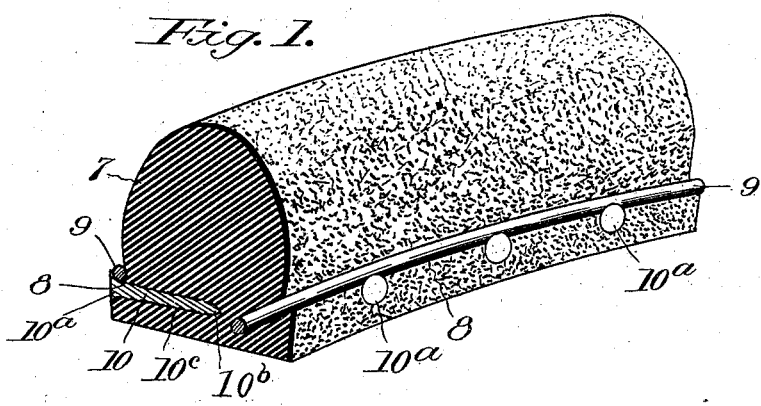
Figure 2:
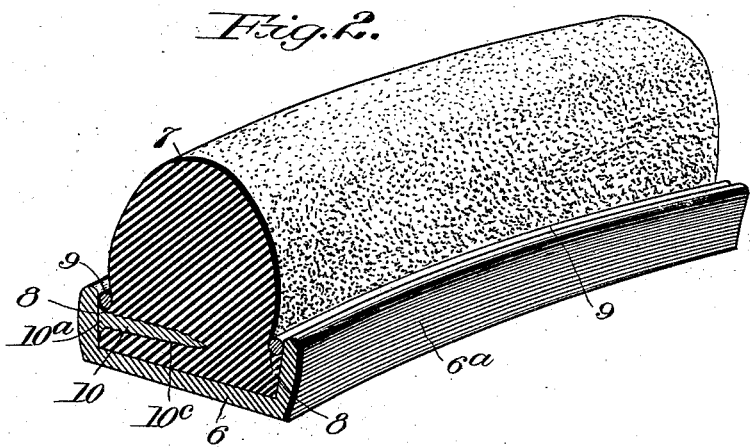
Figure 3:
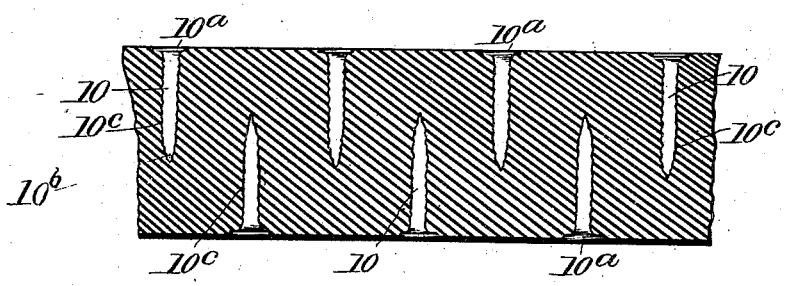

In the accompanying drawings, Figure 1 is a perspective view of a section of the tire. Fig. 2 is a similar view with the rim added. Fig. 3 is a longitudinal section of the tire.

Referring specifically to the drawings, 6 indicates the metal rim, channeled by side flanges $6^a$. The tire is indicated at 7 and is made of rubber or similar suitable material. At each side of the base of the tire a ledge or shoulder 8 is formed, extending around the same, and the circular endless tie-wires 9 rest upon this shoulder, within the flanges of the rim.

Stiffening and retaining bars or pins are indicated at 10. These extend transversely within the base of the tire at or just below the shoulders. These bars are headed, as at $10^a$, the heads being flush with the side of the tire, and are preferably pointed at the inner ends, as at $10^b$, so as to be readily driven in the tire, and are roughened or barbed on the body, as at $10^c$, to more effectually hold them in. The broad tops of the heads are parallel to the inner face of the tire-flange, against which the heads bear, so that a bearing-surface is formed greater than the thickness of the bars, which will long resist the wear and chafing incident to the compression and expansion of the tire in use. The life of the tire is thus greatly prolonged as compared to those tires in which the outer ends of the cross-bars have a small bearing-surface against the rim-flange. The bars are shorter than the width of the tire and are located a short distance apart, preferably on opposite sides alternately. The heads engage under the tie-rods, between the same and the flanges of the rim, producing a hook effect, holding the tire securely to the rim and preventing the same slipping out from under the tie-rods. The tire can buckle or bend out to an extreme extent without disengaging the heads of the bars. Also in tires having cross-bars which extend entirely across the compression of the tire into the narrowing space between the flanges of the rim causes the bars to stick between the flanges and cut the rubber or being unyielding to wear off quickly, so that the tie-rods soon slip off the end of the cross-bars and fail to bind the tire in place. By having a head of considerable size on the end of each bar and by making the bars shorter than the space between the flanges of the rim the bars yield inwardly in compression against the inclined sides of the rim-flanges, and the binding and wearing at the ends of the bars are obviated.

In making the tire instead of molding the bars in with the rubber during the vulcanization thereof, with the objections incident thereto as above referred to, the mold in which the tire is cast is provided with studs corresponding in shape and size to the bars, but preferably somewhat shorter, which leave holes in the tire when the mold is removed, which is done when the rubber is partly vulcanized or "half-cured." Then the bars or pins are driven in the holes and the rubber subjected to the remainder of the curing or vulcanizing process, which effectively unites the bars and the rubber. Substantially every tire thus produced is perfect and serviceable.

What I claim is—

The combination with a flanged rim, of a rubber tire thereon, tie-wires extending longitudinally around the tire on opposite sides thereof, and laterally-yielding bars embedded in and extending partly across the tire, said bars having heads forming retaining-hooks under the tie-wires and enlarged bearing-surfaces against and parallel to the inner face of the rim-flanges.

In testimony whereof I affix my signature in presence of two witnesses.

JAMES CHRISTY, JR.

Witnesses:
  LOUIS G. RANDALL,
  P. MACARDLE.